United States Patent Office 3,440,183
Patented Apr. 22, 1969

3,440,183
2-ETHYLPYROMECONIC ACID AS AN AROMA ENHANCER FOR PERFUMES
Charles R. Stephens, Jr., East Lyme, and Robert P. Allingham, Groton, Conn., assignors to Chas. Pfizer & Co., Inc., New York, N.Y., a corporation of Delaware
No Drawing. Continuation-in-part of application Ser. No. 630,818, Apr. 14, 1967. This application Dec. 12, 1967, Ser. No. 689,778
Int. Cl. C11b 9/00; A61k 7/00
U.S. Cl. 252—522                                1 Claim

ABSTRACT OF THE DISCLOSURE

The use of 2-ethylpyromeconic acid in improving the aroma of perfumes, colognes and industrial odorants.

CROSS REFERENCE TO RELATED APPLICATIONS

This application is a continuation-in-part of copending application Ser. No. 630,818 filed Apr. 14, 1967, now U.S. Patent No. 3,376,317 which is in turn a continuation-in-part of the application Ser. No. 310,919 filed Sept. 23, 1963 and now abandoned.

BACKGROUND OF THE INVENTION

This invention relates to providing improved aroma in perfumes. More particularly, it is concerned with processes for the improvement in the aroma of perfumes which comprise the addition of 2-ethylpyromeconic acid thereto. In addition, it contemplates compositions of perfumes which contain the said 2-ethylpyromeconic acid.

2-ethylpyromeconic acid is a gamma-pyrone of the formula:

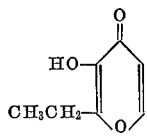

It is an acidic substance which forms salt with bases, which salts can be used interchangeably with the free acid in the instant invention.

It is a matter of common knowledge and experience that the addition of maltol, also known as 2-methylpyromeconic acid, a valuable gamma-pyrone, to many foods improves the flavor and aroma thereof to such an extent that wide consumer acceptance of the practice has been obtained. This appreciation of improved flavor is reflected in increased sales volume of foods so treated. Furthermore, numerous taste panel tests demonstrate that many foods containing maltol are preferred over those from which it is omitted. This acceptance has been found, for example, in edibles such as beverages, confections, baked goods and ice cream. Furthermore, maltol has been added to perfumes, which have their appeal heightened because of maltol's effect of enhancing the desirable aroma thereof.

Maltol is extremely beneficial in the replacement of certain other classical flavor and aroma enhancers in that it is generally much more powerful and, for this reason, can be used in lower amounts. An advantage in this practice is immediately obvious in that such a high strength enhancer may be used at lower levels and, as a result, the natural aroma and taste of maltol itself does not overpower the desired edible flavor and aroma or perfume aroma. For example, it is known that maltol can replace four times its weight of coumarin. Although coumarin has been used very widely in the past, it has such a powerful aroma of its own, resembling that of vanilla beans, that great care must be used to prevent so much being added as to overpower the compositions, maltol, on the other hand, is used in smaller amounts than coumarin, thus providing a margin of safety. Because of this and its lack of toxicity, maltol has replaced coumarin in many foods.

It has now been found that the compound 2-ethylpyromeconic acid, surprisingly, is very much more effective than maltol as an aroma enhancer. In fact, 2-ethylpyromeconic acid has an aroma and flavor-enhancing power of about 6 times that of maltol. Thus, on a relative basis, one part by weight of 2-ethylpyromeconic acid is equivalent to about 24 parts of the aforesaid coumarin in its flavor and aroma enhancing effect.

The advantage in using 2-ethylpyromeconic acid becomes immediately obvious after considering that the relative costs of the said 2-ethylpyromeconic acid and of maltol are of approximately the same order of magnitude. Thus, the consumer is able to use only about one-sixth as much of the 2-ethylpyromeconic acid to achieve the same level of flavor and odor enhancement and realizes very significant savings in manufacturing costs. Furthermore, because of its effectiveness at such low concentrations, effects not possible to achieve with maltol are observed with 2-ethylpyromeconic acid.

It is, therefore, an object of the instant invention to provide means of enhancing the aroma of perfume, said means being achieved with a substantial decrease in cost as compared with commonly employed means.

It is a further object of the instant invention to provide perfumed compositions with enhanced aroma, said compositions being obtained at substantially less cost than those of the prior art.

It is a further object of the instant invention to provide perfume compositions, said compositions having enhanced aroma and being obtained at substantial cost savings over perfume compositions of the prior art.

It is still a further object of the instant invention to provide means for enhancing the aroma of perfumes, said means not contributing any appreciable, undesirable aroma of its own to the perfumes.

These and other objects of the instant invention are readily achieved through use of the process of this invention which, in essence, comprises enhancing the aroma of perfumes by adding 2-ethylpyromeconic acid thereto.

With respect to enhancing the aroma of perfumes, particular mention is made of the especially desirable increase in appeal which is obtained when 2-ethylpyromeconic acid (ethyl maltol) is added in an amount to provide from about 1 to about 100 parts per million by weight calculated on the weight of the perfumed product or composition, e.g. perfumed cosmetic or perfumed industrial product. It is observed that below about 1 part per million there is a tendency for some of the test subjects to have difficulty in discerning the beneficial effect of the addition and that above about 100 p.p.m. some of the subjects begin to notice an aroma effect contributed by the 2-ethylpyromeconic acid itself. It is obvious to those skilled in the art to which this subject matter pertains that for varying purposes varying amounts are required, which may be determined by experimentation. Thus, in some products the test subjects had difficulty in discerning 5 p.p.m. and also in some products less desirable effects are observed above about 100 p.p.m. As will be understood by those skilled in the art, the precise amount of 2-ethylpyromeconic acid to be added will depend on the desired strength of the perfume odor itself. It is found especially convenient to substitute about ⅙ part by weight of 2-ethylpyromeconic acid for each 1 part by weight of maltol in those formulations wherein maltol is a component. Substantial savings may be obtained through the substitution of 2-ethylpyromeconic acid for maltol.

2-ethylpyromeconic acid is a novel gamma-pyrone which is readily prepared by a process which is the subject of a copending application, Ser. No. 310,141, filed Sept. 19, 1963, and now abandoned, by B. E. Tate and R. P. Allingham and assigned to the assignee of the instant invention. As is disclosed in said copending application, 2-ethylpyromeconic acid is prepared readily and economically by a combination of a fermentation technique and organic synthesis. The starting material for the said synthesis is kojic acid and the process generally comprises the steps of oxidizing kojic acid to comenic acid, of decarboxylating said comenic acid to pyromeconic acid, of treating said pyromeconic acid with acetaldehyde to form 2-(1-hydroxy)ethylpyromeconic acid, and reducing this to 2-ethylpyromeconic acid.

With respect to the term "perfumes," as used herein, and in the appended claims, it is meant to contemplate concentrated essences, colognes, and industrial odorants which are commonly used in cosmetic and hygienic products, such as detergents and soaps, and in the perfuming of toabacco, paper, textiles, printing inks, food packages, paints, home deodorants and insecticides.

The terms "perfumed industrial product" and "perfumed composition" as used herein are meant to contemplate the final products such as detergents, soaps, tobacco, paper, textiles, printing inks, food packages, paints, home deodorants and insecticides to which the "perfume" is added.

As has been mentioned hereinbefore, 2-ethylpyromeconic acid at a very low level strengthens the flavor and aroma of a wide variety of products. 2-ethylpyromeconic acid may be added to the perfume directly in the dry form or, alternatively, as a solution. Care should be taken to obtain even distribution through the use of pre-mixing if necessary, since such small quantites have such a powerful effect.

The following specific examples illustrate the practice of the invention, but are not to be construed as limiting the invention to the foods and odorants specifically disclosed.

Example I

Aqueous solutions of 2-ethylpyromeconic acid and of maltol are serially diluted and matched as to odor intensity. It is found that 2-ethylpyromeconic acid has an aroma 6 times as strong as that of maltol. Furthermore, this effect is noticed at a considerably lower concentration than that previously recorded for maltol.

Example II

Pineapple juice flavor is pleasingly enhanced when 2-ethylpyromeconic acid is added at 4 p.p.m., and compared with a control.

Ten p.p.m. of 2-ethylpyromeconic acid added to grape juice greatly amplifies the natural sweet grape aroma.

Five p.p.m. of 2-ethylpyromeconic acid in sherry wine provides an improved flavor; 10 p.p.m. of 2-ethylpyromeconic acid creates a pleasant change in bouquet.

Example III 2-ethylpyromeconic acid is dissolved in a floral base cologne to provide 4, 8, 10, 25, 50, 75 and 100 p.p.m., respectively. The odors of the resulting perfume compositions are determined and compared with that of the untreated perfume as a control. The aromas of the 2-ethylpyromeconic acid-containing perfumes are significantly enhanced.

Example IV 2-ethylpyromeconic acid alone is added to a perfume base solvent at 10 p.p.m. When this is sprayed into an area it provides a pleasant cotton-candy like aroma.

Example V

Ethyl maltol, propyl maltol and maltol were evaluated as to their taste and odor characteristics by a professional flavor chemist having nine years experience in food and perfume chemistry.

Protocol.—Three solutions were prepared containing respectively, 100 p.p.m. of maltol (2-methylpyromeconic acid), ethyl maltol (2-ethylpyromeconic acid), and propyl maltol (2-propylpyromeconic acid) in 25% ethanol-water. Each solution was further diluted with water to levels of 500, 200, 100, and 10 p.p.m. Each of the twelve samples was evaluated as to odor and odor intensity.

Conclusion.—The flavor chemist concluded that (1) the sample containing 500 p.p.m. maltol had about the same level of odor intensity as the sample with 100 p.p.m. ethyl maltol; (2) the sample containing 10 p.p.m. ethyl maltol had an odor intensity stronger than the sample containing 100 p.p.m. propyl maltol but less intense than the sample containing 100 p.p.m. maltol; (3) ethyl maltol-containing samples had an odor character similar to maltol but more intense, sweeter and more desirable than the odor of maltol.

Example VI

A perfumer's extract having a sweet, long-lasting aroma and useful as a ladies perfume is prepared by adding 0.15 part by weight of 2-ethylpyromeconic acid (ethyl maltol) to a perfume oil formulation prepared according to the following recipe and then diluting with perfume grade, SDA39 C ethyl alcohol to a 1% concentration:

| | Parts by Wt. |
|---|---|
| Isobutyl salicylate | 1 |
| Linalool ex Bois de rose Brazil | 2 |
| Synthetic jasmin bouquet | 25 |
| Oil bergamot Italian | 30 |
| Methyl ionone alpha | 7 |
| Musk ambrette | 5 |
| Rhodinol extra | 5 |
| Rose de mai absolute | 4 |
| Coumarin | 4 |
| Aldehyde $C_{10}$ 10% solution in diethyl phthalate | 1 |
| Aldehyde $C_{11}$ undecyclic) 10% solution in diethyl phthalate | 1 |
| Aldehyde $C_{12}$ (lauric) 10% solution in diethyl phthalate | 1 |
| Tincture of civet | 4 |
| Tincture of musk tonquin grains | 4 |
| Oil carrot seed 10% in diethyl phthalate | 1 |
| Orris concrete florentine | 1 |
| Jasmin absolute | 1 |
| Vetiver acetate | 1 |
| Ethyl maltol 5% solution in diethyl phthalate | 3 |
| | 100 |

Example VII

A jasmin bouquet for colognes having a sweet and long-lasting aroma is prepared by adding 0.15 part by weight of ethyl maltol to a bouquet to give the following formulation and thereafter diluting to give a 0.5% concentration in a solvent mixture of 75 parts, perfume grade, SDA 39C, ethyl alcohol and 25 parts, water:

| | Parts by Wt. |
|---|---|
| Oil petigrain South America terpenless | 0.5 |
| Oil ylang ylang | 5.0 |
| Oily thyme red | 1.0 |
| Linalool ex bois de rose | 3.0 |
| Linalyl acetate | 5.0 |
| Benzyl acetate | 42.0 |
| Phenyl ethyl acetate | 2.0 |
| Alpha amyl cinnamic aldehyde | 5.0 |
| Cyclamen aldehyde extra | 9.0 |
| Aldehyde $C_{14}$ 10% solution in diethyl phthalate | 0.2 |
| Aldehyde $C_{18}$ solution in diethyl phthalate | 0.5 |
| Indol | 0.5 |
| Civet | 2.0 |
| Jasmin absolute | 6.0 |

| | Parts by Wt. |
|---|---|
| Amyl acetate | 1.0 |
| Benzyl alcohol | 2.0 |
| Citronellol | 5.0 |
| Ethylene glycol | 50.0 |
| Ethyl maltol 5% solution in diethyl phthalate | 3.0 |
| | 100.0 |

Example VIII

A laundry detergent having a sweet, long-lasting aroma is obtained by adding a bouquet prepared according to the following recipe to a laundry detergent to give an 0.25% concentration of bouquet on the weight of detergent:

| | Parts by Wt. |
|---|---|
| Amyl salicylate | 3.00 |
| Jasmin absolute | 0.30 |
| Amyl cinnamic aldehyde | 0.20 |
| Hydroxy citronellal | 0.20 |
| Phenyl ethyl alcohol | 3.00 |
| Ylang ylang oil | 1.00 |
| Vetiver oil | 1.00 |
| Geranium bourbon | 1.00 |
| Eugenol | 0.60 |
| Bois de rose Brazil | 2.50 |
| Alpha ionone | 0.40 |
| Anisic aldehyde | 1.00 |
| Terpineol | 2.00 |
| Coumarin | 0.40 |
| Heliotropine | 0.20 |
| Phenyl ethyl alcohol | 0.20 |
| Musk ambrette | 0.75 |
| Sandalwood oil | 0.50 |
| Ethyl maltol 10% solution in diethyl phthalate | 3.25 |
| | 20.00 |

Example IX

Food packaging having a pleasant aroma is obtained by incorporating during the processing of the paper a bouquet having the following composition at a level of from about 0.5 to 1.0%:

| | Parts by Wt. |
|---|---|
| Ethyl maltol 10% solution in diethyl phthalate | 5.0 |
| Hexanal | 0.1 |
| Amyl cinnamate | 0.1 |
| Valeryl acetate 10% in alcohol | 0.2 |
| Ethyl methyl phenyl glycidate | 0.2 |
| Ethyl vanillin | 0.4 |
| Aldehyde $C_{14}$ | 0.5 |
| Ethyl caprilate | 0.5 |
| Ethyl lactate | 0.8 |
| Ethyl oenanthate | 0.8 |
| Terpenyl acetate | 0.9 |
| Aldehyde $C_{16}$ | 1.6 |
| Musk xylol | 3.0 |
| Vanitrope | 1.0 |
| Methyl anthranilate | 3.0 |
| Iso amyl butyrate | 6.0 |
| Ethyl butyrate | 7.5 |
| Iso amyl acetate | 8.1 |
| Ethyl acetate | 12.0 |
| Benzaldehyde | 33.3 |
| Rose de mai | 1.0 |
| Methyl ester of rosin | 14.0 |
| | 100.0 |

Example X

An insecticide having a sweet and long-lasting aroma is obtained when a bouquet prepared according to the following recipe is added to the insecticide at a level of from 0.25 to 0.5%:

| | Parts by Wt. |
|---|---|
| Resinoid benzoin | 0.2 |
| Ethyl maltol | 2.0 |
| Musk ambrette | 1.0 |
| Coumarin | 1.5 |
| Neroli oil | 1.5 |
| Linalyl acetate 90/92% | 6.5 |
| Oil lavender terpeneless | 21.0 |
| Oil lavender | 59.0 |
| Patchouli oil | 1.0 |
| Geranium bourbon | 0.5 |
| Oil cedarwood | 2.0 |
| Musk xylol | 1.0 |
| Terpinyl acetate | 2.8 |
| | 100.0 |

Example XI

Textiles having a pleasant and lasting aroma are obtained when a bouquet prepared according to the following recipe is added to the cloth at a level of from 0.25 to 0.5%:

| | Parts by Wt. |
|---|---|
| Ethyl maltol 10% solution in diethyl phthalate | 2.00 |
| Methyl benzoate | 0.25 |
| Coumarin | 0.35 |
| Resinoid of oak moss | 0.50 |
| Musk ambrette | 1.00 |
| Iso eugenol | 1.70 |
| Linalyl acetate 90/92% | 2.00 |
| Oil cananga root | 3.50 |
| Oil bois de rose | 8.50 |
| Oil ylang ylang | 3.50 |
| Oil bergamot | 10.00 |
| Terpineol prime | 14.00 |
| Benzyl acetate | 17.50 |
| Terpinyl acetate | 2.50 |
| Musk xylol | 2.00 |
| Diethyl phthalate | 30.70 |
| | 100.00 |

Example XII

Printing inks having a sweet, pleasant and long-lasting aroma are prepared when a bouquet of the following formulation is added to the ink at a level of about 0.25 to 0.5%:

| | Parts by Wt. |
|---|---|
| Lavandin 40-42% | 10.00 |
| Thyme white extra | 7.00 |
| Iso bornyl acetate | 10.00 |
| Rosemary oil | 18.00 |
| Benzyl acetate | 25.00 |
| Pine steam distilled (Pynol) | 25.00 |
| Para cymene | 2.00 |
| Ethyl maltol | 1.00 |
| Terpineol prime | 0.50 |
| Linalool ex Bois de rose | 1.50 |
| | 100.00 |

Example XIII

Interior paints having a pleasant aroma are obtained when a bouquet prepared according to the following formulation is added to the paint at a level of from about 0.5 to 0.75%:

| | Parts by Wt. |
|---|---|
| Resinoid styrax | 0.5 |
| Diphenyl oxide | 2.0 |
| Oil citronella formosa | 1.5 |
| Ethyl maltol | 1.0 |
| Alpha amyl cinnamic aldehyde | 3.0 |
| Musk xylol | 4.0 |
| Oil bois de rose | 3.0 |

| | Parts by Wt. |
|---|---|
| Geraniol for soap | 5.0 |
| Oil bergamot | 5.0 |
| Hydroxy citronellal | 5.0 |
| Oil cedarwood | 10.0 |
| Benzyl acetate | 20.0 |
| Terpineol prime | 24.5 |
| Linalool terpenes | 2.5 |
| Ethyl acetate | 13.0 |
| | 100.00 |

EXAMPLE XIV

Wrapping paper having a pleasant and long-lasting aroma is obtained by adding a bouquet prepared according to the following formulation to the paper during processing at a level of from about 0.25 to 0.5%:

| | Parts by Wt. |
|---|---|
| Limes oil expressed | 0.5 |
| Coumarin | 0.5 |
| Musk ambrette | 0.5 |
| Aldehyde $C_{12}$ 10% in diethyl phthalate | 0.5 |
| Orange oil sweet U.S.P. | 0.8 |
| Musk xylol | 1.0 |
| Fixateur 404 Firmenich Inc. 10% solution [1] | 2.0 |
| Ethyl maltol | 1.0 |
| Geraniol extra | 5.8 |
| Benzyl acetate | 25.0 |
| Rhodinol pure | 5.0 |
| Jasmin substitute | 37.5 |
| Orange terpenes | 10.0 |
| Heliotropine | 5.0 |
| Patchouli oil | 1.0 |
| Geranium oil bourbon | 1.0 |
| Sandalwood oil | 0.9 |
| Amyl acetate | 1.0 |
| Diethyl phthalate | 1.0 |
| | 100.0 |

[1] Fixateur 404 is a trade name of Firmenich, Inc. (New York) for a perfume fixative.

Example XV

A tobacco having a sweet, pleasant and long-lasting aroma is obtained by adding a tobacco flavor prepared according to the following formulation to unflavored tobacco at a level of from about 0.5 to 1%:

| | Parts by Wt. |
|---|---|
| Lees of wine (French cognac oil) 10% solution in ethyl alcohol | 2.0 |
| Lemon oil 10% solution in ethyl alcohol | 2.0 |
| Ethyl maltol | 1.0 |
| Methyl cyclopentonolon | 0.5 |
| Oleoresin cinnamon 10% solution in alcohol | 3.0 |
| Pear brandy | 10.0 |
| Prune juice distillates | 50.0 |
| Prune juice 70° brix | 20.0 |
| Propylene glycol | 11.5 |
| | 100.0 |

Example XVI

A powdered hand cleaner having a pleasant and long-lasting aroma is obtained by adding a bouquet prepared according to the following formulation to a detergent composition at levels of from about 0.25 to 0.5%:

| | Parts by Wt. |
|---|---|
| Eugenol | 15 |
| Iso eugenol | 25 |
| Butyl acetate | 10 |
| Linalool ex bois de rose Brazil | 10 |
| Terpineol extra | 3 |
| Musk ambrette | 1 |
| Phenyl ethyl alcohol | 2 |
| Diethyl phthalate | 30 |
| Ethyl maltol 10% solution in diethyl phthalate | 4 |
| | 100 |

What is claimed is:

1. Perfume containing from about 1 to about 100 p.p.m. by weight of 2-ethylpyromeconic acid as an aroma enhancer and a perfume.

References Cited

UNITED STATES PATENTS 3,130,204   4/1964   Tate et al. _____ 167—94

ALBERT T. MEYERS, Primary Examiner.

J. GOLDBERG, Assistant Examiner.